Nov. 17, 1936.  W. W. COWGILL  2,061,188
TREATMENT OF FOOD MATERIALS
Filed Feb. 13, 1933
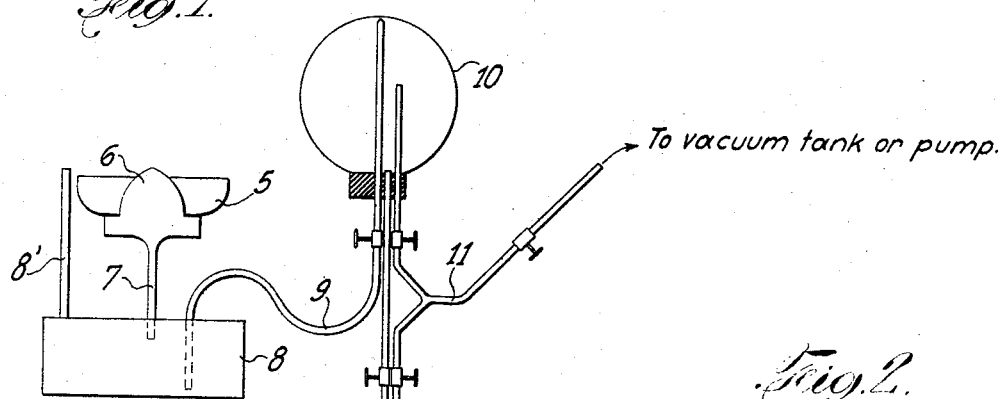
Fig.1.
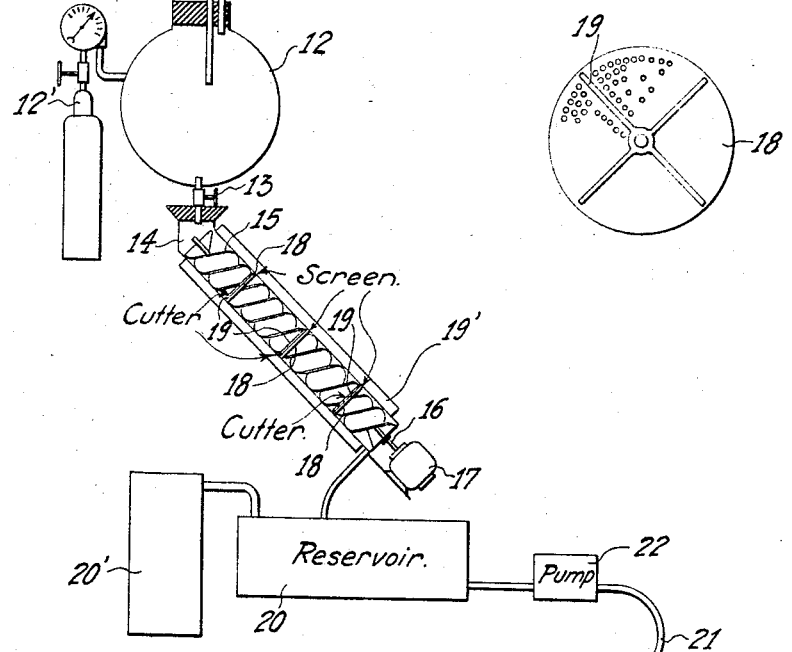
Fig.2.
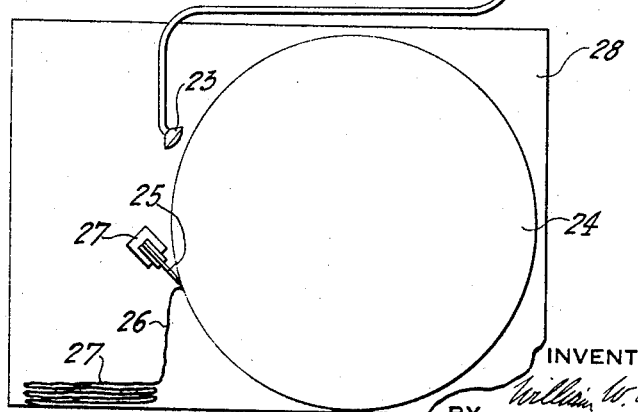
INVENTOR-
William W. Cowgill
BY
ATTORNEYS Patented Nov. 17, 1936

2,061,188

UNITED STATES PATENT OFFICE 2,061,188

TREATMENT OF FOOD MATERIALS

William W. Cowgill, Fairfield, Conn., assignor to Sardik Incorporated, Jersey City, N. J., a corporation of Delaware Application February 13, 1933, Serial No. 656,443

2 Claims. (Cl. 99—204)

This invention relates to the treatment of food materials and more particularly to the treatment of citrus fruits to render them resistant to ordinary deteriorating influences.

It has heretofore been impractical commercially, if not actually impossible, to treat citrus fruits such, for example, as oranges to preserve them without injuring the nutritive and palatable qualities of the material. In my opinion this is due to the characteristic structure of citrus fruit in which each section is composed of a large number of individual juice sacs which are not only relatively large in size but are themselves formed with numerous inner sacs or chambers separated from each other by walls or partitions which insulate the material therein against the effect of both heat and refrigeration. For example, such a structure so retards the escape of moisture from the juice in the case of drying as to increase the time of drying to such an extent that the esters, vitamins and other desirable components of the fresh fruit are injured by prolonged heating, oxidation or the like. Unlike other fruits such, for example, as the apple, citrus fruits are characterized by the ready separability of the liquid and solid constituents of the pulp. Most of the solid part is provided by the walls of the juice sacs within which the liquid and other components of the juice are confined. If the juice is squeezed out of the sacs to provide what is commonly known as "orange juice", the solid particles formed by the juice sacs provide relatively large individual pieces which are freely movable in and readily separable from the thin liquid juice, on the surface of which they tend to collect. When in this form the material is difficult to dry without destroying certain desirable characteristics thereof, as it can only be distributed over a drying surface with such a separation of the solid and liquid components of the material as deprives the liquid of a satisfactory carrier for the solid and semi-solid residue of the liquid after the evaporation of water therefrom. Similarly, when in this form the material is difficult to freeze without such a separation of the different ingredients by crystallization or the like as prevents the proper recombination thereof upon thawing for use.

An object of this invention is to provide a process of treating citrus fruit to render the same resistant to ordinary deteriorating influences, which can be carried on substantially without injury to the components of the fresh material.

This and other objects which will be apparent to those skilled in this particular art are accomplished by the invention hereinafter described, which can be carried out with any desired form of apparatus such, for example, as that illustrated in the accompanying drawing in which Fig. 1 shows a diagrammatic lay-out of apparatus for use in carrying out the process of the present invention, and Fig. 2 shows a sectional view of a detail.

The present invention will be described in connection with the treatment of oranges, but it is not, of course, in any way limited thereto.

When treating an orange, for example, the pulp is first separated from the rind and from as much as possible of the white tissue, known as "rag", which intervenes between the rind and the pulp and which is also found between the sections of pulp, care being taken not to get oil from the rind into the pulp. Seeds are also separated out. The pulp is immediately immersed in an inert atmosphere such, for example, as nitrogen, to protect it against oxidation until it can be passed through a vacuum to remove all air and oxygen that may be entrapped in the material. This removal of air from the material is preferably accomplished as soon as possible after the pulp is separated from the rind although it may be accomplished at any point desired in the process.

The present invention contemplates the extraction of water from the material in the case of drying, or freezing the mixture in the case of refrigeration, so quickly as to substantially prevent injury to the vitamins, esters and other desirable components. In order to overcome the difficulties resulting from the presence of large juice sacs which tend to separate from the thin liquid juice, it has been proposed to add particles of cellular material to the orange juice to increase the solid content thereof in the belief that citrus fruit pulp did not have sufficient solid material, but I have discovered that the juice sacs themselves provide sufficient solid material and that the difficulties can be overcome by subjecting the pulp to an operation wherein the individual juice sacs are cut into relatively small particles and these particles are then thoroughly mixed with and evenly dispersed throughout the liquid juice. As a result of this operation the viscosity of the juice is very materially increased due to the thickening effect of the small particles which are of such size and arrangement that they can be dispersed for treatment over either a drying or freezing surface to provide a carrier or binder for the material after treatment.

In the case of drying, any desired process of subjecting the cut cellular material and juice to the drying heat can be employed, providing it is such as to remove the moisture so quickly as to forestall substantially all damage to the material other than the extraction of moisture therefrom. The process of drying described in an application filed by Jack D. Sartakoff, Serial No. 582,815, December 23, 1931, now Patent No. 1,908,489, is especially suitable. In this process the particles are so dispersed over the drying surface as to be substantially separated from each other and surrounded by the juices and other ingredients of the fruit. In this way all particles, together with the surrounding juices and the like, are immediately accessible to and affected by the drying heat, with the result that the moisture is quickly driven off before any substantial injury to the desirable components of the material can result. The dispersal of the particles is such that they do not insulate each other from the drying heat, while at the same time they provide a carrier for the dried components of the juice after the moisture has been extracted. As a result of this dispersal of the particles the time of heating is so short that the dried particles with the dried juices adhering thereto can be removed from the drying surface before any injury, other than the extraction of moisture therefrom, can occur. When this process is employed the dried particles may be consolidated to form a coherent mass such as the film described in the Sartakoff application. If the material is to be frozen, the process described in my co-pending application Serial No. 626,235, filed July 29, 1932, may be employed. In that process the particles are dispersed over a freezing surface and are there subjected to such a low temperature as to freeze the material before any substantial damage to the desirable components can occur.

The accompanying drawing shows a diagrammatic lay-out of apparatus which can be employed in carrying out the present process, but it will be apparent that other apparatus and other arrangements of apparatus than that indicated are equally suitable.

Assuming it is intended to dry orange pulp, such pulp is separated from the rind, seeds, and as much of the white "rag" as is possible. This may be accomplished on a standard orange juice extractor 5 which, if desired, may have a power-operated rotary burr 6 and is preferably provided with a pipe 7 for immediately delivering the separated pulp and juice to a tank 8 filled with an inert gas which may, for example, be heavier than air. When the inert gas is heavier than the air, the tank 8 need not be sealed as the gas will lie on the bottom thereof and cover the pulp therein. An overflow tube 8' is provided to permit variation in the amount of material within the tank without loss of gas. A quantity of air and oxygen will, of course, be entrapped within the pulp and it is desirable to remove this as soon as possible so as to prevent any oxidation which would be produced thereby. Accordingly, the pulp is drawn from the tank 8 through a pipe 9 to a vacuum chamber 10 connected through a line 11 to a vacuum tank or pump which extracts substantially all air, oxygen and the like from the pulp. From the chamber 10 the pulp flows by gravity to a second chamber 12 which may be connected to the same vacuum line 11. By a suitable arrangement of valves indicated in the drawing, the vacuum in the chamber 12 may be relieved and an inert gas delivered thereto from a storage tank 12' after which the pulp flows, preferably by gravity, through a valve controlled line 13 to a cutting mechanism 14 filled with a similar inert gas.

The cutting mechanism has a rotary feeding worm 15 mounted on a shaft 16 extending longitudinally through the cutter and adapted to be driven from any suitable source of power such as a motor 17, to feed the pulp through the device. Perforated plates or screens 18 are located at spaced intervals longitudinally of the device and the pulp is forced by the feeding worm 15 to pass through the perforations of these plates. A rotary knife or knives 19 are mounted on the shaft 16 in contact with the surface of each plate or screen 18 and rotate with the shaft 16 across the surface of the associated plate, so that the juice sacs passing through the plates are subjected to repeated cutting operations and are cut into relatively small particles. If it is desired to maintain the temperature of the cutting mechanism within a predetermined range, this can be done by a conventional water jacket 19'.

From the cutting mechanism the pulp flows into a reservoir 20 which is also filled with an inert atmosphere, and connected to a compensating chamber 20' for maintaining a substantially constant pressure in the reservoir despite variations in volume of material therein. From the reservoir 20 the pulp is forced through a pipe or line 21 by a pump 22 to one or more spray nozzles 23 by means of which the particles are distributed over the treating surface. In the case of drying the treating surface is preferably the outer surface of a rotary, interiorly heated drum 24 across which the nozzles extend and which is heated to a predetermined temperature and rotated at a predetermined speed. The drum may be housed in a chamber 28 preferably filled with an inert gas. On the drum 24 the material is preferably subjected to the Sartakoff process of drying in which the particles are so distributed over the drying surface that all portions of the material are subjected to substantially the same amount of drying heat for substantially the same period of time. As each particle is subjected directly to the drying heat only a relatively low degree of heat is required and the moisture is extracted therefrom so quickly that the material can be removed from the drum before any substantial amount of oxidation or other form of injury is done to the vitamins, esters and the like. As described in the Sartakoff application, the dried material is removed from the drum by a scraper or knife 25 preferably at such a temperature that the concentrated binding substances of the original material cause the particles to adhere together and form a porous film 26 which can be folded to form a laminated mass 27 and packaged in any desired manner. It is usually desirable to cool the knife by a conventional water jacket 27.

Under some conditions it may be desirable to evacuate the material to remove air and oxygen therefrom after the cutting operation instead of before, or the evacuation can be performed both before and after cutting. Obviously, any sequence of such operations is contemplated by this invention.

If it is desired, the entire process up to the delivery of the material from the spray head may be conducted at a reduced temperature to prevent any possible deterioration of the material during its preparation for drying, by housing the mechanisms in a refrigerated chamber. If this is done, the temperature, of course, will not be below the freezing point of water and if the material is to be dried it may be passed through a warming coil, not shown, just prior to the ejection thereof from the spray head.

The temperature and time of drying on the drying surface must be coordinated so as to obtain the requisite degree of dryness, preferably less than 24% moisture, without injury to the material and, preferably, in the shortest practical time. Because of the speed with which the water can be evaporated from the material by the present process, it will be found possible to dry satisfactorily at a temperature substantially below the boiling point of water and approximating the boiling point of the volatile constituents or about 175° Fahrenheit, with the result that these desirable constituents are to a large extent retained in the dried product. I have satisfactorily dried citrus pulp by heating for not more than fifteen seconds on a drum having a surface temperature of not over 175° Fahrenheit, although I believe that shorter drying periods and lower temperatures will prove to be practical.

If the material is to be frozen, as described in my above mentioned application, the treating or freezing surface may be provided by the same drum 24, but in this case the temperature of the drum will be low enough to freeze the dispersed particles with the adhering juices and the like almost instantly. Preferably the temperature will be about −40° Fahrenheit. The chamber 28 is preferably refrigerated to aid in the freezing operation and the frozen material is removed by the doctor 25 or any other suitable device.

I claim:

1. The process of preparing a food product of reduced moisture content from citrus fruit material containing juice sacs which consists in cutting each individual juice sac into a plurality of separate particles of relatively small size to produce a greatly increased number of structurally individual solid particles and to expose the contents of said juice sacs for treatment, distributing said particles substantially evenly throughout the liquid component of the material to provide a uniform suspension of said particles in said liquid, then distributing the material over a heated drying surface to substantially separate said particles thereon so that each particle will be subjected to a substantially equal amount of heat, subjecting the particles in dispersed condition to heat sufficient to reduce the moisture content to a predetermined point, and removing the material from said surface.

2. The process of preparing a food product of reduced moisture content from citrus fruit material containing juice sacs which consists in cutting each individual juice sac into a plurality of separate particles of relatively small size to produce a greatly increased number of structurally individual solid particles and to expose the contents of said juice sacs for treatment, distributing said particles substantially evenly throughout the liquid component of the material to provide a uniform suspension of said particles in said liquid, then distributing the material over a heated drying surface to substantially separate said particles thereon so that each particle will be subjected to a substantially equal amount of heat, subjecting the particles in dispersed condition to a drying temperature of approximately 175° F. for a period of approximately fifteen seconds to reduce the moisture content to a predetermined point, and removing the material from said surface.

WILLIAM W. COWGILL.